(12) United States Patent
Murphy et al.

(10) Patent No.: US 6,740,344 B2
(45) Date of Patent: May 25, 2004

(54) CALCIUM FORTIFIED PRODUCTS AND METHODS OF PREPARATION

(75) Inventors: Maeve Murphy, Plymouth, MN (US); Ellen M. Silva, Minnetonka, MN (US); Gary W Stoddard, New Brighton, MN (US); Amy Konkoly, Minneapolis, MN (US); Timothy T Johnson, St. Anthony Village, MN (US)

(73) Assignee: General Mill, Inc., Minneapolis, MN (US)

( * ) Notice: Subject to any disclaimer, the term of this patent is extended or adjusted under 35 U.S.C. 154(b) by 82 days.

(21) Appl. No.: 09/728,443

(22) Filed: Dec. 1, 2000

(65) Prior Publication Data
US 2002/0068112 A1 Jun. 6, 2002

(51) Int. Cl.$^7$ ................................................. A23C 9/12
(52) U.S. Cl. ............................. 426/34; 426/42; 426/43; 426/74; 426/580; 426/583
(58) Field of Search ............................. 426/34, 36, 41, 426/42, 43, 44, 46, 74, 580, 582, 583

(56) References Cited

U.S. PATENT DOCUMENTS

| | | | | |
|---|---|---|---|---|
| 4,784,871 A | * | 11/1988 | Park | 426/583 |
| 5,186,965 A | * | 2/1993 | Fox et al. | 426/74 |
| 5,449,523 A | * | 9/1995 | Hansen et al. | 426/42 |
| 5,820,903 A | * | 10/1998 | Fleury et al. | 426/74 |

\* cited by examiner

*Primary Examiner*—Leslie Wong
(74) *Attorney, Agent, or Firm*—Everett G. Diederiks, Jr.; John A. O'Toole; Annette M. Frawley

(57) ABSTRACT

Nutritionally improved cultured dairy products, such as milk beverages and yogurt products, include a fine powdered calcium phosphate salt of reduced particle size having a mean diameter $\leq 6\mu m$ in amounts sufficient to provide a total calcium content of 0.25% to 0.75%. A method for producing the calcium fortified products is also provided wherein an fine powdered insoluble calcium salt is admixed with a milk blend prior to fermentation. A yogurt can then be prepared by conventional fermentation. Both stirred style and cup set style yogurt products can be prepared.

31 Claims, 2 Drawing Sheets

CALCIUM FORTIFIED PRODUCTS AND METHODS OF PREPARATION

FIELD OF THE INVENTION

This invention relates to food products, especially refrigerated fermented dairy products such as yogurt that are calcium fortified and to their methods of manufacture, and more specifically to yogurt fortified with calcium.

BACKGROUND OF THE INVENTION

The present invention provides improvements to those calcium fortified yogurt products and methods of preparation that are described in U.S. Pat. No. 5,820,903 entitled "Calcium Fortified Yogurt and Methods of Preparation" (issued Oct. 13, 1998 to Fluery et al.) and which is incorporated herein by reference. The '903 patent describes the post fermentation addition of a calcium phosphate having a particle size of less than 150 microns to produce a calcium fortified stirred style yogurt. In important part, the present improvement resides in selecting and adding a more fine powder form of calcium phosphate having a particle size of less than six microns to a milk base prior to fermentation. By utilizing the more fine powder, it has been surprisingly found that pre-fermentation addition can be practiced. As a result, methods have now been found to produce either a stirred style yogurt product or a cup set fermented yogurt product from the same or similar calcium fortified milk base. Moreover, the process can be simplified relative to the post fermentation addition to eliminate the need for preparing a sterilized, pH adjusted calcium phosphate slurry for post fermentation addition.

Recent medical studies have indicated that a diet containing the U.S. recommended daily allowance ("RDA") of calcium can be effective in preventing or mitigating osteoporosis, and also possibly high blood pressure and colon cancer. There is therefore great public interest in the consumption of food products that will supply the recommended daily allowance of calcium.

Nutritionists and consumers alike recognize dairy products as good sources of calcium. Consumers who may be most in need of an adequate calcium intake (e.g., dieters, the pregnant or middle aged women, and children) are target consumers for yogurt products.

An unfortified six ounce (170 g) serving of fruit-flavored low fat yogurt provides only approximately 200 to 250 mg of calcium (i.e., about 0.12% to about 0.15% calcium). The current RDA is 1000 mg. Thus, the natural calcium content of yogurt must be supplemented by fortification with added calcium in order for a single serving of yogurt to provide 100% or even 50% of the current RDA for calcium. This problem is even more severe for yogurt products containing up to about 20% fruit sauce since such fruit materials are low in native calcium content.

Serious practical difficulties have been encountered in incorporating supplemental calcium into dairy products because most calcium salts have very low solubility in milk. Indeed, in milk itself, up to 60 to 70% of the calcium exists as insoluble colloidal calcium phosphate associated with the casein micelles. Added calcium salts, being generally insoluble and not suspended by casein, therefore tend to settle out, frustrating attempts to maintain uniform dispersions during manufacture.

This problem of suspending insoluble calcium salts is compounded by the fact that generally the yogurt base should not be agitated during the incubation period, i.e., the yogurt should be quiescently fermented. Thus, in the manufacture of yogurt using vat incubation, the required lack of agitation during incubation can cause a substantial portion of an insoluble calcium salt to settle to the bottom of the vat. The salt then must be laboriously scraped off the bottom of the vat and blended into the yogurt. In light of these cleaning difficulties, this process is not only impractical using conventional yogurt manufacturing equipment, but also is likely to adversely affect the texture of the product. In the production of cup set or in cup fermented yogurt products, the fermentation step should also be quiescently fermented. Settling can result in a product unacceptable to the consumer.

The prior art, however, includes a variety of efforts to overcome the substantial problems of calcium fortification of yogurt. One approach to the calcium fortification of yogurt is disclosed in U.S. Pat. No. 5,449,523 (issued on Sep. 12, 1995 to Hansen) entitled "Process For The Manufacture Of A Calcium Fortified Yogurt With Improved Heat Stability." In this method, an expensive soluble source of calcium is employed. Adding to the cost of the '523 patent is that the calcium content of the already expensive material is less than a third of the preferred salt, tricalcium phosphate, used herein. Moreover, the methods employed in the '523 patent require the addition of chelating agents to avoid undesirable milk protein precipitation. Usage of such required chelating, however, can adversely affect the flavor of the product. The chelating source(s) contribute an undesirable flavor to the yogurt at the high levels necessary to fortify to 1000 mg calcium. More importantly, however, the cost of the calcium source is prohibitive for a commercially practical product.

Similarly, the art includes numerous teachings directed towards forming a highly soluble complex of citric acid, malic acid and calcium. (See, for example, U.S. Pat. No. 5,186,965 entitled "Calcium Citrate Malate Composition"). While useful, such formulations require addition of expensive special ingredients or extensive processing to form the materials in situ.

Still another approach is to try to employ inexpensive insoluble calcium materials (see particularly, U.S. Pat. No. 4,784,871 entitled "Method For Producing Calcium Fortified Yogurt," issued Nov. 15, 1988 to Peter H. Park). The '871 patent teaches admixing an acid soluble salt optionally with sugar with an essential acidic fruit blend. The acidic fruit blend is allowed to dissolve a portion of the calcium salt. About 5 to 45% of the product of the fortified fruit blend with the partially dissolved calcium is then admixed with a fermented yogurt base to prepare a calcium fortified fruit containing yogurt product. Sugar is added to the fruit to assist in the avoidance of lumping of the calcium phosphate salt. Thus, the invention relies upon the fruit to solvate a portion and to suspend the balance of the insoluble calcium within the yogurt product.

While useful, not all yogurt flavors popular today contain fruit. Thus, it would be desirable to be able to provide a calcium-fortified yogurt that did not require the presence of a fruit ingredient. Moreover, it would be desirable to provide a reduced calorie yogurt fortified with calcium that did not require sucrose. Thus, the present invention can be viewed as an improvement upon the product and methods of the '871 patent.

Also, it is desirable to have methods of calcium fortification that can be practiced by yogurt producers that can be used to provide both stirred style as well as cup set style yogurts using, to the extent possible, common techniques and equipment.

In view of the state of the art, there is a continuing need for new and improved yogurt products, particularly those providing enhanced nutritional benefits.

Accordingly, it is an objective of the present invention to provide new nutritionally improved yogurt products and their methods of preparation. A further objective is to provide new and effective methods for calcium fortification of fermented dairy products such as yogurt.

Another objective is to provide methods for preparing calcium fortified yogurts that minimize milk protein precipitation.

Still another objective is to provide methods for calcium fortification that do not require usage of expensive calcium materials.

Another objective of the present invention is to provide new methods for preparing calcium supplemented yogurts fortified with inexpensive calcium materials.

Another objective is to provide improved calcium fortified yogurt products that exhibit both good taste and good texture.

Still another objective is to provide calcium fortified beverages, especially milk based beverages.

Still another objective is to provide calcium fortified milk whether refrigerated or ultra high treated milk.

Still another objective is to provide calcium fortified food products such as milk based beverages and milk based wet foods such as yogurt that are fortified with calcium from their native levels by addition of insoluble calcium.

Surprisingly, the above objectives can be obtained and improved calcium fortified yogurt products can be provided. The present invention resides, in part, in the discovery that by providing insoluble calcium salts, of a particular particle size, that improved organoleptically acceptable calcium fortified products can be obtained that do not require a fruit ingredient.

SUMMARY OF THE INVENTION

In its preferred process aspect, the present invention resides in methods of preparing a fermented dairy product fortified with calcium that is visually undetectable in the final product and of acceptable organoleptic attributes in terms of grittiness and chalkiness. The process involves the pre fermentation addition of calcium phosphate in the form of a fine powder essentially characterized by a mean diameter of $\leq 6\mu$. The methods comprise the steps of A) providing a warm pasteurized milk base having a native calcium content fortified with sufficient amounts of calcium phosphate of the requisite particle size to provide a total calcium content ranging from 110% to 500% of the native level and, B) inoculating the warm pasteurized calcium phosphate fortified heat treated milk base with a starter culture; and C) fermenting the inoculated milk base to provide a yogurt; and D) cooling the yogurt to arrest the fermentation to provide a chilled yogurt having a viscosity of at least 1500 centipoise (at 5° C.). The fermentation step is preferably practiced in bulk fermentation tanks to provide stirred style yogurt products although in-cup fermentation can be just as easily practiced to provide set style yogurt products.

In one product aspect, the present invention resides in products prepared by practicing the present methods.

In another product aspect of one and the same invention, the present invention is directed towards high moisture food products fortified with fine calcium phosphate powder such as milk based foods or dairy products and especially fermented dairy products such as yogurt comprising a fermented dairy product base having a viscosity of at least 1500 cps (at 5° C.) and a calcium phosphate salt in a quantity sufficient to bring increase the calcium content of the composition from about 250 to 1300 mg per 170 g serving (0.15% to 0.75% by weight, wet basis).

The calcium amounts include both the native level supplied by the milk source as well as the supplemental added calcium.

The calcium salt is selected from the group consisting of tricalcium phosphate, dicalcium phosphate, and their hydrates, and mixtures thereof.

The fine calcium phosphate powder comprises particles having a mean diameter 6 microns or less. ("Mean Diameter $\leq 6\mu$").

DETAILED DESCRIPTION OF THE INVENTION

The present invention relates to improved calcium fortified dairy products especially fermented dairy products such as yogurt containing pulverant or finely powdered insoluble calcium phosphate and to their methods of preparation. Each of these product components as well as product use and attributes and preparation steps are described in detail below.

Throughout the specification and claims, percentages are by weight and temperatures in degrees Centigrade unless otherwise indicated.

Providing a Pasteurized Calcium Fortified Milk Blend

Figure 1:
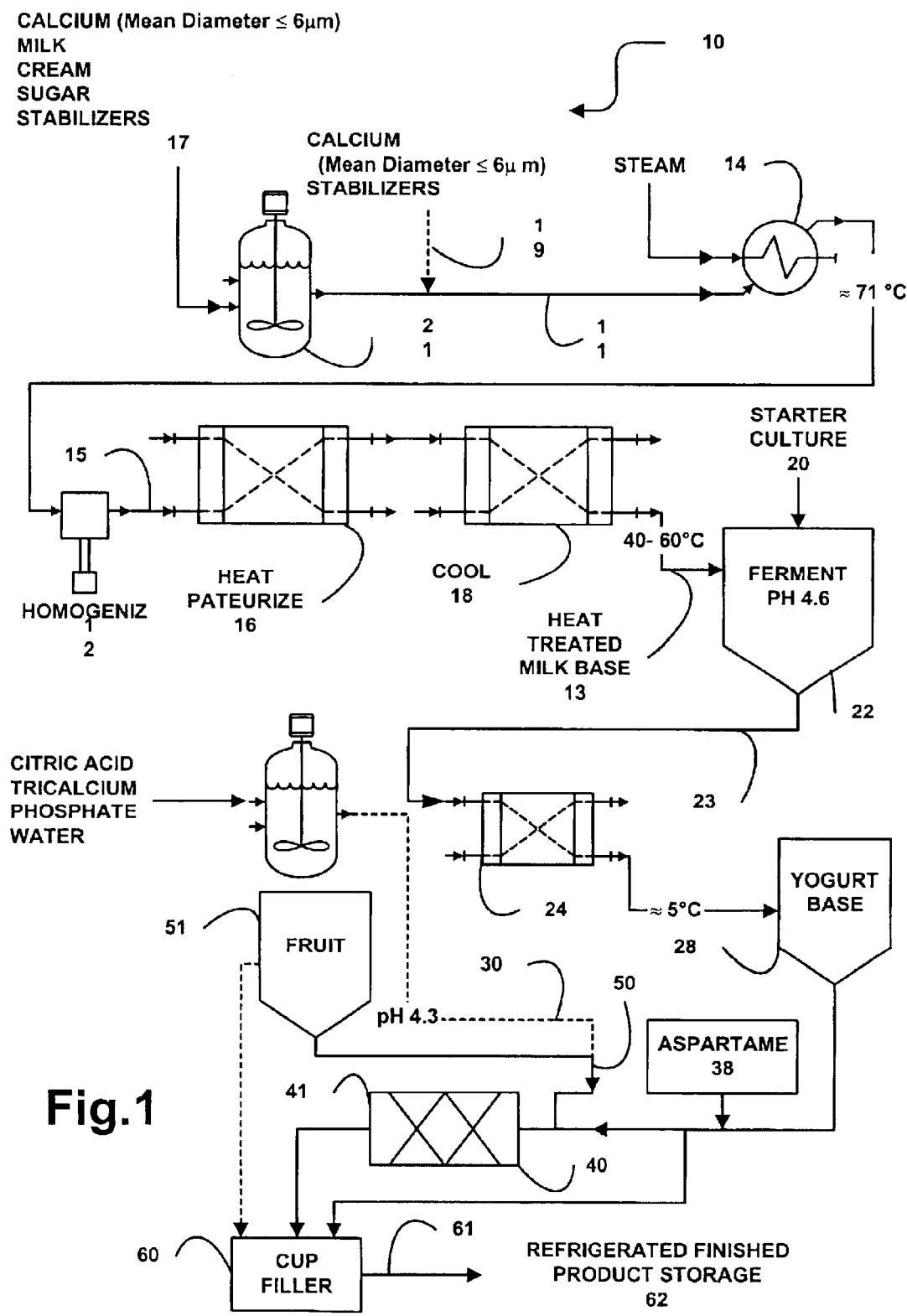
FIG. 1 is a highly schematic process flow diagram illustrating one embodiment of the present methods of preparation involving the vat bulk preparation of a fermented dairy product.

Referring now to FIG. 1, it can be seen that in preferred form, the present methods generally designated by reference numeral 10, the first essential step is to provide a pasteurized calcium fortified milk blend 13.

Conveniently, this first step can include the substeps of (1) providing a calcium fortified milk base 11, (2) homogenizing the milk base 12, (3) pasteurizing the homogenized milk base 14, and (4) bringing the pasteurized calcium fortified milk base to fermenting temperatures 16 such as by cooling.

Briefly, the process typically begins with milk blend ingredients 17 such as raw milk, that can contain a combination of whole milk, skim milk, condensed milk, dry milk (dry milk solids non-fat or, equivalently, "MSNF"), grade A whey, cream and/or such other milk fraction ingredients as buttermilk, whey, lactose, lactalbumins, lactoglobulins, or whey modified by partial or complete removal of lactose and/or minerals, other dairy ingredients to increase the nonfat solids content, which are blended to provide the desired fat and solids content. While not preferred, the milk base can include a filled milk component, i.e., a milk ingredient having a portion supplied by a non-milk ingredient, e.g., oil or soybean milk.

While in the present invention, particular emphasis is directed towards fermented bovine milk products such as yogurt, the skilled artisan will appreciate that the present invention is also suitable for use in a wide variety of thickened dairy products, particularly fermented dairy products such as kefir, sour cream and the like.

Also, while bovine milk is preferred, other milks can be used in substitution for bovine milk whether in whole or in part, e.g., goat, sheep or even equine milk. Also, the present calcium fortification techniques can be used to provide calcium fortified soybean milk products. However, since the native level of calcium in soy milk products is less than mammalian milks, e.g., about 50 mg per 100 g fluid soybean milk, greater amounts a calcium phosphate can be added to provide equivalent calcium nutrition levels. Conversely, if a soy milk providing only low levels of calcium, e.g., only 100 mg calcium per 100 g serving, then about 0.5% calcium can be added to the soybean milk based milk blend 11 to supplement the native calcium of soybean milk. Also, while cultured dairy products prepared from bovine milk are preferred, cultured products can also be made from soybean milk based products. If desired, the milk blend can comprise chocolate for chocolate based milk products such as chocolate fluid milk or chocolate soybean milk.

Conveniently, the raw milk and sweeteners (such as fructose, corn syrup, sucrose) can be blended in a first mix tank 21 and stored in a milk silo not shown. Stabilizers and thickeners such as starch, gelatin, pectin, agar and carrageenan can also be added if desired. The minor dry ingredients are combined with the sweetened milk to form the milk base 11 can conveniently in a separate mixing vessel (not shown).

The milk blend 21 additionally essentially comprises an added finely powdered calcium phosphate to fortify the milk blend with calcium. The particular degree of calcium content and fortification can be expressed in several different ways. Most broadly, sufficient amounts of calcium salt is added to provide a total (native plus supplemental) calcium content of mammalian milks of about 0.25 to 0.75% by weight. Such a level provides about 425 to 1300 mg of total calcium per 170 g (6 oz) serving and about 565 to 1725 mg of total calcium in a 227 g (8 oz) serving. Preferred for use herein are yogurts fortified with calcium providing about 500 to 1300 mg per serving whether from the six or eight ounce serving. Most preferred are yogurts providing about 500 to 800 mg calcium per serving (6 oz), that is, a yogurt providing 50% to 100% of the current recommended daily allowance for calcium.

Useful herein as the source of supplemental calcium is calcium phosphate. Calcium phosphate is generally available as a mono basic ($CaH_4(PO_4)_2 \cdot H_2O$), di-basic ($CaHPO_4 \cdot 2H_2O$) or tribasic ($Ca_3(PO_4)_2$) salts. Preferred for use herein is tricalcium phosphate, $Ca_3(PO_4)_2$, ("TCP") because of its high weight percentage of calcium (about 38%). Moreover, TCP is slightly more soluble than other calcium phosphate salts.

A useful tricalcium phosphate starting material is also known as tribasic calcium phosphate or tricalcium orthophosphate and is available in food chemicals codex grade from Gadot Biochemical Industries Ltd., P.O.B. 10636 Haifa Bay 26118 Israel under the trade name "TCP-LD or Tricalcium Phosphate LD" having the general formula $3Ca_3(PO_4)_2 \cdot Ca(OH)_2$. This product provides an assayed calcium content of from 34 to 40% by weight. Less preferred but nonetheless useful herein is anhydrous dicalcium phosphate, also known as anhydrous dibasic calcium phosphate, having a formula of $CaHPO_4$. An anhydrous dicalcium phosphate material is also available from Stauffer in food chemical codex grade, providing an assay calcium content from about 30 to about 31.7% calcium by weight. Other calcium phosphate hydrates also can be useful, including, but not limited to, calcium pyrophosphate, calcium hexametaphosphate and monobasic calcium phosphate.

Phosphate salts are a preferred source of calcium, not only because of their acid solubility and weight ratios, but also because they are available commercially as a pure precipitate from reacting $Ca(OH)_2$ with phosphoric acid. By appropriate size classification, a calcium phosphate of requisite size can be obtained in commercial quantities.

The skilled artisan will appreciate that while the present calcium phosphate salts are characterized herein as insoluble, of course, some small percentage will dissolve in water depending in part upon the temperature and pH. However, at the concentrations of calcium salt used both in the slurry and the yogurt products herein, the great percentage is in a solid state.

Unfortunately, other calcium salts that might otherwise be thought as useful but cannot be employed for one reason or another include, calcium ascorbate (too expensive), calcium citrate (creates a chalky product and imparts a bad after taste), calcium carbonate (too effervescent especially in an acidic food product such as cultured dairy products and imparts a bad off-flavor), calcium gluconate (too expensive), calcium lactate (too expensive and bad flavor), and calcium sulfate (too strongly flavored). Furthermore, these soluble calcium salts may cause premature protein precipitation during pasteurization of the yogurt base, resulting in unacceptable yogurt quality.

Most importantly, the calcium phosphate flour has a particle size having a mean diameter of less than or equal to six microns ("$\leq 6\mu$"). Having a calcium phosphate being of sufficiently reduced particle size is important to maintaining the calcium in suspension in the milk blend for extended times and to avoiding a "grittiness" organoleptic attribute in the finished yogurt. Preferably, the calcium phosphate has a particle size of less than or equal to 5 microns ("$\leq 5\mu$").

Of course, the calcium phosphate material will have a particle size distribution curve. Surprisingly, if a significant amount of the calcium phosphate (i.e., >10%) is larger than about 150 microns, then the calcium phosphate begins to become perceptible as imparting an undesirably "chalky" mouth feel. For the very best product, preferred herein are yogurt finished products wherein the calcium phosphate particle size is such that the mean particle size is less than four microns and at least 90% of the calcium phosphate has a particle size of less than or equal to six microns.

A useful technique for ensuring that the calcium phosphate is of the requisite particle size in small scale production is to screen a calcium phosphate starting material. For example, a maximum of 0.5% on a #140 U.S. standard sieve and a minimum of 95% through a #325 U.S. standard sieve is preferred (wet sieve method).

Optionally, all or a portion of the calcium phosphate can be added blended with the various stabilizers, e.g., gums, starches after the bulk ingredients are mixed as indicated by dotted line having reference numeral 19.

Next, the milk base 11 is homogenized 12 in a conventional homogenizer to disperse evenly the added materials and the fat component supplied by various ingredients thereby forming an homogenized milk base 15. If desired, the milk base 11 can be warmed 14 prior to homogenization from typical milk storage temperatures of about 5° C. to temperatures of about 65 to 75° C. with steam.

This homogenized milk base 15 is then pasteurized 16, typically by heating for times and temperatures effective to accomplish pasteurization to form a calcium fortified pasteurized milk base. As is well known, the milk base 11 can be heated to lower temperatures for extended times, e.g., 88°

C. for 30 minutes, or alternately to higher temperatures, e.g., 95° C., for shorter times, e.g., for about 38 seconds. Of course, intermediate temperatures for intermediate times can also be employed. Other pasteurization techniques can be practiced (e.g., light pulse, ultra high pressure, etc.) if effective and economical. In certain commercial practices, the sequence of the homogenization and pasteurization steps can be reversed.

In still other embodiments of the present invention, such as for the preparation of shelf stable fluid milk products, the heating step 16 can be extended to provide an ultra heat treatment or "UHT" fluid milk product that is calcium fortified.

The homogenized and pasteurized base is then brought to incubation temperature, usually about 40° C. to 60° C., preferably about 40 to 46° C. When heat pasteurization is employed, this step typically is a cooling step 16.

Thereafter, the homogenized and pasteurized milk blend is inoculated with a desired culture 20. Usually, a combination of *Lactobacillus bulgaricus* and *Streptococcus thermophilus* bacteria is added to begin the fermentation process. In other variations, *Lactobacillus acidophilus* or *L. bifidus* can also be added. The present methods further essentially comprise fermenting 22 or culturing the inoculated milk blend to desired endpoints of pH, titratable acidity, time, etc. to provide a warm cultured dairy product such as a yogurt 23. The fermentation step 22, is continued an in highly preferred embodiments, quiescently continued (i.e., without agitation), until the pH of the milk blend reaches approximately 4.4 to 4.6 to form the yogurt base. Depending upon temperature and amount of culture added, this can take from about three to about 14 hours. It is important that the mixture not be agitated during the fermentation process to allow proper curd formation. It is an advantage of the present invention that by selection of such a finely powdered calcium phosphate that surprisingly, the added calcium material does not settle out during fermentation even when quiescently practiced.

The particular fermentation endpoint pH can vary modestly. Typically, the endpoint pH can range from about 4.2 to 4.6, preferably about 4.45 to 4.55.

When the proper pH has been reached, the present methods further essentially comprise cooling 24 the warm yogurt (e.g., to about 2 to 21° C., preferably about 5° C.) to arrest further growth and any further drop in the pH to form a cooled yogurt 28 or calcium fortified yogurt base.

The yogurt base 28 thus prepared importantly is characterized by a viscosity of at least 1500, preferably at least 2300 cps (at 5° C.). Such a viscosity is helpful to suspending the insoluble calcium salt. At a viscosity of 1500 cps, the yogurt is a thinner substance useful for a yogurt beverage-type product. Yogurt viscosities can range up to 25000 cps.

While the above described particular process can be used, any vat set fermented yogurt can be used.

Moreover, although a live yogurt product is preferred, the present invention can also be used in yogurt-based foods as distinguished from a yogurt product. For example, a shelf stable yogurt-based product is prepared by heat treating a yogurt to inactivate the culture and packaging aseptically (not shown). In this variation, the pH of the yogurt based product can be adjusted for taste or for compatibility with other ingredients. For example, the pH can be adjusted upwards substantially for a chocolate flavored yogurt based product.

In a less preferred embodiment, the pre-fermentation addition of calcium phosphate of the present invention can optionally be combined with the post fermentation addition 30 of a calcium slurry 31 as described in U.S. Pat. No. 5,820,903 as indicated by the dotted line. While useful as described in the '903 patent, such post addition requires separate make up tanks, adds extra moisture to the yogurt and can require pasteurization of the calcium slurry prior to addition to the yogurt base 28. Such post fermentation addition thus adds extra equipment, steps and thus extra cost to yogurt production.

If practiced, step 30 involves mixing the calcium phosphate with water to form a slurry 31. Generally, the slurry 31 can comprise about 20 to 50% calcium phosphate, preferably 25 to 40% and about 50 to 75% water, preferably about 60 to 70%.

The present calcium phosphate materials are highly alkaline, especially when dispersed in water. In order to avoid raising the pH of the yogurt when the calcium phosphate is admixed, it is desirable to "acidify" the calcium phosphate slurry 31. That is, the pH is brought to the approximate acidity of the yogurt being fortified by addition of an acid. It is also important to avoid over acidifying the calcium phosphate. Thus, the pH should be within a few tenths of a pH of the yogurt.

Since the pH of the yogurt generally will range from about 4.4 to 4.6, good results are generally obtained when the aqueous slurry pH ranges from about 4.0 to 4.6, preferably about 4.4 to 4.6. The preferred pH of the calcium aqueous slurry is at the pH of the yogurt or below.

The slurry pH is adjusted to particular values within the above range by addition of an acid or acidulant. Useful herein as the acidulant is adipic, citric acid, fumaric, malic acid, and mixtures thereof. Preferred for use herein as an acidulant is citric acid.

The slurry makeup can include a supplemental heating step with vigorous agitation (not shown) to pasteurize and insure hydration and suspension of the insoluble calcium salt. Thereafter, the slurry can be heated to about 73.9 to 87.8° C. (165 to 190° F.). The preferred temperature of the calcium slurry is the same as or below the yogurt upon admixture. Thus, if a heating step is employed, thereafter, the slurry can be cooled to or below the temperature of the yogurt base (2 to 21° C. depending upon whether added to the yogurt base before or after the yogurt base has been cooled) prior to admixture therewith to reduce thermal shock to the yogurt. The heating substep not only aids in dispersion of the calcium but also insures that the slurry is pasteurized prior to admixture with the yogurt base. For example, if the yogurt base is at 5° C., the slurry should be about 2 to 5° C.

The slurry 31 and yogurt 28 are admixed 40 using minimum shear so as to avoid degrading the yogurt base's viscosity. As illustrated in FIG. 1, an in-line static mixer 41 can be used to blend the slurry into the yogurt base by static mixing to minimize shear.

If desired, the yogurt base cooling and calcium admixing steps can be reversed. In this variation, a warm slurry is added to the still warm yogurt base. The blend is then cooled thereafter to about 5° C.

In certain embodiments, particularly low fat and/or low calorie variations, the yogurt product herein comprises a high potency non-nutritive carbohydrate sweetening agent. For example, high potency sweeteners include aspartame, sucrose, potassium acelsufame, saccharin, cyclamates, thaumatin and mixtures thereof. Especially preferred for use herein is aspartame.

If aspartame is employed, an aqueous dispersion 38 thereof can be prepared and added to the yogurt base. The aspartame is preferably added separately from the calcium slurry since aspartame tends to degrade under the processing conditions of the slurry preparation.

The calcium slurry 31 can also contain vitamin D. Vitamin D enhances calcium absorption. Vitamin D can be added up to 400 I.U. per quart of food "yogurt" per the yogurt standards of identity by this technique or otherwise.

If desired, various flavors can be added with or in a manner similar to the aspartame dispersion 38. Illustrative flavors include vanilla, chocolate, amaretto cheesecake, white chocolate, Boston cream pie, Café Au Lait, caramel apple, banana cream pie and mixtures thereof.

If desired, the calcium fortified yogurt 28 can additionally include a conventional fruit sauce or puree 51. If present, the fruit constituent can comprise about 5 to about 15% of the yogurt product. The present method thus can comprise the optional additional step of adding a fruit sauce or puree 50.

In the manufacture of Swiss-style yogurt, a fruit flavoring is blended substantially uniformly throughout the yogurt after fermentation is complete but prior to packaging 50. A second static mixer 54 can be used to blend the fruit sauce into the yogurt with minimal shear.

In the manufacture of "sundae" style yogurt, fruit sauce or puree is deposited at the bottom of the consumer container, and the container is then filled with the yogurt mixture. To prepare a sundae style yogurt product employing a stirred style yogurt, the milk base is prepared with added thickeners and/or stabilizers to provide upon resting a yogurt texture that mimics a "set" style yogurt. In this variation, the fruit is added directly to the container, typically to the bottom, prior to filling with the yogurt.

The fruit flavoring sauce or puree used in the invention can be any of a variety of conventional fruit flavorings commonly used in yogurt products. Typical flavorings include strawberry, raspberry, blueberry, strawberry-banana, boysenberry, cherry-vanilla, peach, pineapple, lemon, orange and apple. Generally, fruit flavorings include fruit preserves and fruit or fruit puree, with any of a combination of sweeteners, starch, stabilizer, natural and/or artificial flavors, colorings, preservatives, water and citric acid or other suitable acid to control the pH. Minor amounts (e.g., providing less than 50 mg of calcium per 226 g serving) of calcium can be added to the fruit to control the desired texture of the fruit preparation typically provided by a soluble calcium material such as calcium chloride.

If aspartame is added to the yogurt base, all or a portion of the aspartame can be pre-blended with the fruit flavoring.

If desired, the milk base can be formulated with thickeners and setting agents that will set up after cup filling that will impart a texture to the yogurt that mimics a set-style type yogurt product.

The products can additionally include a variety of other ingredients to increase their nutritional, organoleptic or other consumer appeal, e.g., fruit pieces, nuts, partially puffed cereals, etc.

The yogurt base can optionally further comprise a nutritive carbohydrate sweetening agent(s). Exemplary useful nutritive carbohydrate sweetening agents include, but are not limited to, sucrose, high fructose corn syrup, dextrose, various DE corn syrups, beet or cane sugar, invert sugar (in paste or syrup form), brown sugar, refiner's syrup, molasses (other than blackstrap), fructose, fructose syrup, maltose, maltose syrup, dried maltose syrup, malt extract, dried malt extract, malt syrup, dried malt syrup, honey, maple sugar, except table syrup and mixtures thereof.

Preferably, the yogurt is unaerated. That is, the yogurt phase(s) can have a density of from about 0.9 to 1.2 g/cc. However, in other variations the yogurt can be aerated to about 0.5 to 0.8 g/cc, especially for soft serve frozen yogurt products. The yogurt product, whether or not aerated, can be frozen, e.g. to −2° C. to −5° C., to provide soft-serve frozen yogurt products, or frozen to colder temperatures, e.g., −8° C. to −15° C. to provide harder, more ice cream type properties. Such freezing can after packing or otherwise in accordance with common practice.

The calcium fortified yogurt is then charged to a conventional container.

The present methods can further comprise charging or filling 60 the calcium fortified yogurt 28 or inoculated milk blend with or without fruit (whether blended with the yogurt base or as a separate phase) to containers such as 6 oz. or 8 oz. cups such as a coated paper or plastic cup (polypropylene or polystyrene) or other suitable containers or packages of desired shape. For example, recent new commercial yogurt products have included being filled into tubes fabricated from flexible film. After filling, the filled containers are applied with a lid or other closure, assembled into cases and entered into refrigerated storage for distribution and sale size, etc. to provide finished refrigerated products 61 that are stored and/or and the present methods can further comprise distributing 62 through refrigerated storage conditions.

The methods depicted in FIG. 1 are especially suitable for use in connection with the commercial production of stirred style yogurt products. Of course, the skilled artisan will appreciate that other calcium fortified cultured dairy products such as kefir, sour cream, cottage cheese, and cheeses can be prepared from the described calcium fortified pasteurized milk blends described. The calcium fortified dairy products can be used or consumed in conventional or further processed and combined with other food ingredients to provide calcium fortification.

Figure 2:
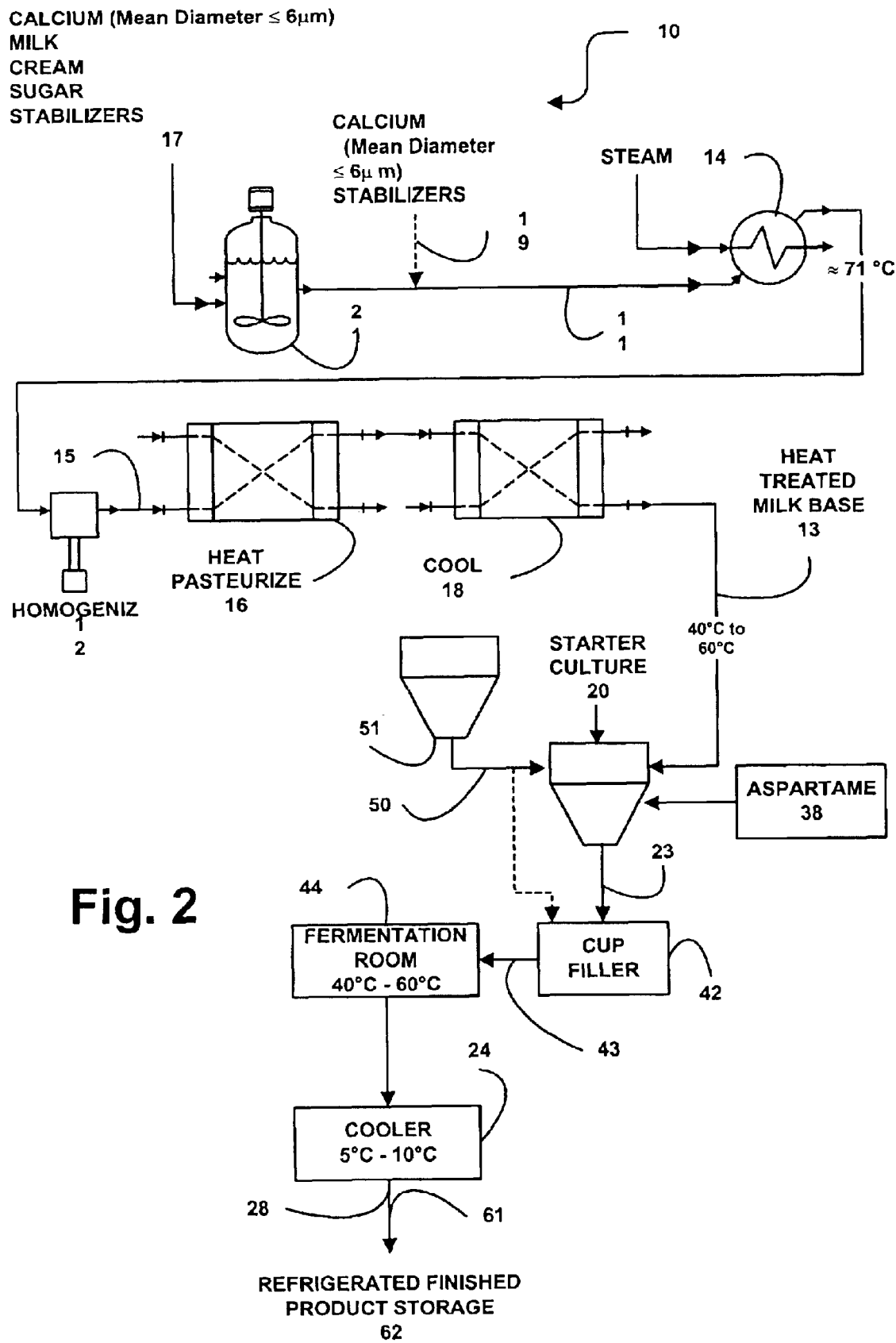
FIG. 2 is a highly schematic process flow diagram illustrating another embodiment of the present methods of preparation involving the cup set preparation of a fermented dairy product.

Reference is now made briefly to FIG. 2 which illustrates embodiments of the present methods that are particularly suitable for use in providing set style yogurt products by in cup fermentation. For convenience, FIG. 2 bears similar reference numerals to FIG. 1 for like steps and intermediate products. The sequence and practice of steps in this variation is similar to those described above and depicted in FIG. 1 through the step of inoculating 20 the calcium fortified milk base 19 to provide an calcium fortified inoculated warm milk 23. However, FIG. 2, depicts that the present methods can comprise reversing the order of the cup filling and fermentation steps such as to include filling 42 the cups or containers with inoculated warm milk 23 prior to fermentation to provide cups 43 filled with inoculated warm milk. Thereafter, the methods can involve fermenting 44 in the cup or in situ fermentation such as by holding the filled cups in fermentation rooms maintained at suitable temperatures (e.g., 40° C.–60° C.). In highly preferred variations such fermentation is practiced quiescently for times sufficient to provide endpoint pH values, titratable acidity, viscosity, etc. It is a surprising advantage of the present invention that by selecting and employing a finely powdered calcium phosphate that settling of the calcium mineral fortifying ingredient is minimized during the quiescent fermentation step.

FIG. 2 further depicts that the methods can involve adding 50 a fruit sauce or puree 51 to either the inoculated warm milk or, less preferably (as indicated by dotted lines), the cups or containers. Thereafter, the methods can involve cooling 24 the warm fermented yogurt 23 to arrest the fermentation step such as by holding the cups in a cooler or cooling room maintained at refrigerated temperatures of 5° C.–10° C. As the yogurt cools, the texture sets to form a calcium fortified cup set style yogurt products of the present invention.

Description of Finished Product Attributes

The present invention provides both fermented dairy products and methods for addition of a high level of calcium to yogurt products. The resulting yogurt has an acceptable texture and flavor. The present invention provides calcium fortification of yogurts that do not contain a fruit preparation.

While the invention finds particular suitability for a connection with yogurt, the skilled artisan can appreciate that the invention can also be used in connection with other fermented dairy products such as sour cream and kefir. Also, non-fermented dairy products having the requisite viscosity can be prepared, e.g., starch gels (puddings), frozen desserts, cheeses (e.g., processed cheese). In such products, the particular pH of the slurry can be adjusted to the pH typical of the product to be fortified.

EXAMPLE 1

A calcium fortified stirred style yogurt of the present invention was prepared as follows:

150 kilograms of low fat yogurt base mix was produced using whole milk, skim milk, and nonfat dry milk to make a blend with 2.8% butterfat and 13.2% milk solids non fat. To this blend was added 19.5% liquid sugar, 1.5% modified food starch, 0.5% gelatin, and 0.18% of the fine tricalcium phosphate from Godat Biochemical. Dry ingredients were incorporated with a powder funnel into a centrifugal pump to disperse the dry particulates.

A starter culture was prepared by heat treating skim milk fortified with nonfat dry milk to 12% milk solids. This mixture was held at 74° C. for 45 minutes and then cooled while agitating the mixture. When the mix was cooled to 46° C., a commercial freeze dried or frozen yogurt starter culture was added. This was allowed to mix for sufficient time to disperse the starter culture innoculum. The agitation was then turned off and the culture was allowed to ferment until the pH of the mixture was reduced to 4.6 by the lactic acid production of the bacteria. The culture was to cooled to 4° C.

This mix was then heated through a plate heat exchanger to 74° C. and homogenized through a two stage homogenizer at 1000 psi first stage and 500 psi second stage for a total of 1500 psi. The homogenized mix was then further heated in a plate heat exchanger to 90° C. and was passed through a holding tube that maintains the temperature for 8 minutes to form a pasteurized calcium fortified milk blend or base. The heat treated base was then cooled to fermentation temperatures in a plate heat exchanger to 43° C. to form a yogurt base.

The yogurt base was then blended with 5% starter culture by weight to form an inoculated calcium fortified yogurt base. The inoculated base was fermented at 43° C. to a pH of 4.5. The fermented base was then cooled in a plate heat exchanger to 5° C. At this point a strawberry fruit preparation from was added at 5% by weight along with at 0.002% color, and 0.2% Natural Strawberry flavor.

This mixture was well blended and filled into cups The final product was then moved to a refrigerated cooler at 4° C. and stored.

The finished product had a pleasant acceptable flavor and texture and did not have precipitated proteins.

Products of substantially equivalent organoleptic attributes are obtained when the liquid sugar is replaced by aspartame to equivalent sweetness levels and when the yogurt products additionally comprises supplemental vitamin D.

EXAMPLE 2

A calcium fortified cup set style yogurt product of the present invention was prepared as follows:

The inoculated yogurt base prepared as described above in Example was filled into cups and sealed prior to moving to a temperature controlled room for fermentation at 46° C. Fermentation was checked by sampling cups until a pH of 4.5 was measured which was achieved in 3.5 hours. After fermentation to desired pH, the cups were then moved to a refrigerated cooler at 4° C. and cooled rapidly to arrest fermentation to provide finished calcium fortified yogurt products.

What is claimed is:

1. A method of producing a dairy product fortified with a fine powdered of calcium phosphate, comprising the steps of:

A. providing a warm pasteurized milk blend having a temperature of 40° C. to 60° C. comprising a milk blend having a native calcium context and sufficient amounts of calcium phosphate in powder form comprising particles having a mean diameter of ≦6 μm to provide a total calcium content of 125% to 500% of the native calcium content.

2. The method of claim 1, additionally comprising the step of:

B. inoculating the warm pasteurized calcium phosphate fortified heat treated milk base with a starter culture to form an inoculated milk base.

3. The method of claim 2, additionally comprising the step of:

C. fermenting the inoculated milk base to provide a yogurt.

4. The method of claim 3, additionally comprising the step of:

D. cooling the yogurt to arrest the fermentation to provide a chilled yogurt having a viscosity of at least 1500 centipoise (at 5° C.).

5. The method of claim 3, wherein the fermentation step is practiced quiescently.

6. The method of claim 4 additionally comprising the step of: adding the chilled yogurt to a container to form a filled yogurt container.

7. The method of claim 6 wherein the container is a cup.

8. The method of claim 6 wherein the container is a flexible tube fabricated from a flexible film.

9. The method of claim 4 additionally comprising the step of:

adding the inoculated milk base to a container prior to fermenting Step C.

10. The method of claim 6 wherein the chilled yogurt additionally comprises a fruit sauce.

11. The method of claim 1 wherein the milk blend comprises mammalian milk.

12. The method of claim 1 wherein the calcium source is selected from the group consisting of tricalcium phosphate, dicalcium phosphate, their hydrates, and mixtures thereof.

13. The method of claim 9 wherein additionally comprising about 5 to 15% by weight of the fermented dairy product of a fruit ingredient.

14. The method of claim 13 wherein the fermented dairy product is a yogurt having a viscosity of at least 2300 cps (at 5%).

15. The method of claim 6 wherein the fermented dairy product is a yogurt and wherein the yogurt is free of a fruit ingredient.

16. The method of claim 6 wherein the calcium salt is tricalcium phosphate.

17. The method of claim 6 additionally comprising the step:

maintaining the chilled yogurt container at about 5° C. to about 10° C.

18. The method of claim 1 wherein the total calcium content ranges from about 0.25% to about 0.75%.

19. The method of claim of claim 1 wherein the milk blend comprises at least one mammalian milk ingredient.

20. The method of claim of claim 1 wherein the milk blend comprises at least one soybean mill ingredient.

21. The method of claim of claim 1 wherein the milk blend comprises is chocolate flavored.

22. The method of claim 1, additionally comprising the step of:

B. cooling the calcium fortified pasteurized milk blend to about 1° C. to 10° C. to form a calcium fortified refrigerated milk.

23. In a method of producing a fermented dairy product by inoculating a pasteurized milk blend having a native calcium content and fermenting, the improvement comprising:

adding calcium phosphate in particulate in powder form comprising particles having a mean diameter of $\leq 6\,\mu m$ to provide a total calcium content of 125% to 500% of the native calcium content of the milk blend prior to pasteurization.

24. The method of claim 23 wherein the fermented dairy product is yogurt.

25. The method of claim 24 wherein yogurt includes a live culture and has a viscosity of at least 2300 cps (at 5°C.).

26. The method of claim 25 wherein the yogurt is free of a fruit ingredient.

27. The method of claim 25 wherein the calcium phosphate is tricalcium phosphate having a mean particle size of $\leq 5\,\mu m$.

28. The method of claim 27 wherein the yogurt is a stirred style yogurt.

29. The method of claim 27 wherein the yogurt is a cup set style yogurt.

30. The method of claim 29 wherein the added calcium comprises tribasic calcium phosphate.

31. The method of claim 25 additionally comprising the step of forming the yogurt into an aerated soft-frozen yogurt product having a density of 0.5 to 0.8 g/cc and a temperature of −5 to −8° C.

* * * * *